United States Patent [19]

Vyse

[11] Patent Number: 4,965,446
[45] Date of Patent: Oct. 23, 1990

[54] OPTICAL INTERRUPTER SYSTEM WITH VIBRATION COMPENSATION

[75] Inventor: Tom Vyse, San Diego, Calif.

[73] Assignee: IVAC Corporation, San Diego, Calif.

[21] Appl. No.: 340,847

[22] Filed: Apr. 20, 1989

[51] Int. Cl.$^5$ .............................................. G01D 5/34
[52] U.S. Cl. ...................... 250/231.14; 250/231.17; 250/237 G; 341/13
[58] Field of Search ............ 250/231 SE, 233, 237 G, 250/231.14, 231.17; 341/13, 52, 35, 192

[56] References Cited

U.S. PATENT DOCUMENTS

| | | | |
|---|---|---|---|
| 3,323,051 | 5/1967 | Woods | 324/70 |
| 3,394,264 | 7/1968 | Busey | 250/233 |
| 3,399,347 | 8/1968 | Martens | 324/96 |
| 3,757,128 | 9/1973 | Vermeulen | 250/231 SE |
| 3,814,934 | 6/1974 | Mesh et al. | 250/231 SE |
| 4,221,963 | 9/1980 | Fushimi | 250/231 SE |
| 4,253,021 | 2/1981 | Ernst | 250/231 SE |
| 4,417,141 | 11/1983 | Phillips | 250/231 SE |
| 4,604,521 | 8/1986 | Takekoshi et al. | 250/231 SE |
| 4,616,131 | 10/1986 | Burkhardt | 250/231 SE |
| 4,623,328 | 11/1986 | Hartranft | 604/4 |
| 4,637,264 | 1/1987 | Takahashi et al. | 73/862.33 |
| 4,650,993 | 3/1987 | Boella et al. | 250/231 SE |
| 4,668,862 | 5/1987 | Waibel | 250/231 SE |
| 4,688,019 | 8/1987 | Schmitt | 250/231 SE |
| 4,692,613 | 9/1987 | Masuda et al. | 250/231 SE |
| 4,774,494 | 9/1988 | Extance et al. | 250/231 SE |
| 4,866,269 | 9/1989 | Wlodarczyk et al. | 250/231 SE |

Primary Examiner—David C. Nelms
Assistant Examiner—Stephone B. Allen
Attorney, Agent, or Firm—Fulwider, Patton, Lee & Utecht

[57] ABSTRACT

The optical interrupter system includes a moving member having a sequence of optical flags, interposed between a source of illumination and a detector, such that as the optical flags of the moving member are illuminated and detected, the detector generates a signal having a waveform with a first portion less than a first threshold, a second portion greater than the first threshold and less than a second threshold, and a third portion greater than the second threshold. Signal processing circuitry operates to generate a count signal indicating a transition between the first and third waveform portions.

9 Claims, 2 Drawing Sheets

OPTICAL INTERRUPTER SYSTEM WITH VIBRATION COMPENSATION

BACKGROUND OF THE INVENTION

1. Field of the Invention

This invention relates generally to the field of rotation monitoring and control systems, and more particularly relates to optical encoders for providing information relating to the rotational phase of a rotating disc.

2. Description of Related Art

Shaft angle encoders and rotational angle encoders producing sensor voltages having pulse characteristics or sinusoidal waveform characteristics have been used for controlling shaft angle position in mechanical control systems, and have been used in tachometers for monitoring rotational velocity, or other parameters, by counting either complete or partial revolutions In a device such as fluid pump, the volume of fluid dispensed can be monitored by counting the number of complete or partial revolutions of a cam wheel. Where such a cam wheel or disc contains reflective portions or apertures, the phase of rotation of the wheel or disc may be monitored optically; however, monitoring of rotational position is subject to error due to vibrations, particularly when the optical wheel is subject to slower rotation or stopping.

In the circumstance of connection of a medical infusion pump between an IV bottle and an IV line to a patient, the monitoring of fluid flow may be subject to error due to vibrations from patient movement, or movement of the patient from one location to another. Typically, such medical infusion systems will provide an alarm signal when an error in the monitoring of fluid flow due to vibration is detected, and the infusion is interrupted until the system can be reset in a vibration free situation.

One prior art method of error detection due to vibration is "quadrature" detection, which is a common industry standard. Where an optically encoded disc includes a row of volume counting flags, "quadrature" detection involves the use of an additional row of flags offset from the row of volume counting flags by one quarter of the distance from the beginning of one flag to the beginning of the next flag. By monitoring the two rows of offset counting flags, the system can provide an indication of both the direction and amount of motion, and the system is thereby less subject to errors due to vibration. According to this scheme, if the distance from the leading edge of one flag on one row of flags to the leading edge of the next flag on the same row of flags is considered to be 360 degrees, and the length of the space between the flags on either row is equal to the length of the flags on that row, then a new signal would be encountered every 90 degrees, thus the name "quadrature" detection. Accordingly, implementation of the quadrature detection scheme requires three rows of optical encoder flags, and three optical interrupters, if the system is also to include a row of tachometer flags.

Vibration compensation can also be accomplished electronically. Tachometers including anti-jitter circuitry for monitoring the passage of three sets of slots arranged around a rotating disc are known; a tachometer is also known that includes a rotating disc with apertures and which utilizes electronics, including Schmitt trigger circuitry with a minimum hysteresis of 2 degrees, to ensure against undesired readings due to backlash or vibrations. Various shapes for optical flags on optical discs are also known in the art; and a tachometer utilizing an optical disc with apertures designed to produce pulses having leading and trailing edges is also known. However, vibration-related errors can still occur as the optical disc rotates and as the flags are counted, if the speed of rotation is slow enough and a vibration of the optical disc occurs, so that the disc moves in a reverse direction, corrupting the count. It would be desirable to provide an optical encoder apparatus, which instead of relying upon detection of the edges of an optical flag essentially blurs the edge transistion of an optical flag. It would be desirable to maximize this blurred region in order to obtain a maximum insensitivity to vibration. It would also be desirable to provide an electronic signal processing system designed to identify and monitor intermediate portions of a waveform generated by the optical flags, in order to avoid false readings due to edge transistion vibrational errors.

SUMMARY OF THE INVENTION

The present invention provides an improved optical encoder system for monitoring the rotational position of an encoder disc having optical flags arranged in a row on the disc, which is significantly more effective in compensating for vibration of the system. The system purposely blurs edge transistions of optical flags and includes signal processing circuitry designed to sense the passing of intermediate portions of waveforms detected in the optical encoding of rotational positions, maximizing insensitivity of the system to vibrational errors.

Briefly and in general terms, an optical encoder apparatus according to the invention includes a moving member having a sequence of optical flags, interposed between a source of illumination and a detector, such that as the optical flags of the moving member are illuminated and detected, the detector generates a signal having a waveform with a first portion less than a first threshold, a second portion greater than the first threshold and less than a second threshold, and a third portion greater than the second threshold. Signal processing circuitry operates to generate a count signal indicating a transition between the first and third waveform portions.

In a preferred embodiment, the moving member of the optical encoder apparatus is a rotational disc, and the optical encoder determines rotational phase position of the disc. The shape of each optical flag is preferably designed to cause the detector to generate a signal having waveform with a leading edge, a leading intermediate portion, a central portion, a trailing intermediate portion, and a trailing edge portion. The optical flags are most preferably formed in the shape of a rectilinear cross.

Other aspects and advantages of the invention will become apparent from the following detailed description, and the accompanying drawings, which illustrate by way of example the features of the invention.

DETAILED DESCRIPTION OF THE INVENTION

Figure 1:
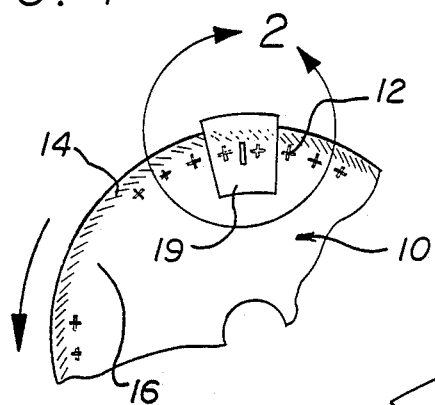
FIG. 1 is a top plan view of an optical encoder disc of the invention.
Figure 2:
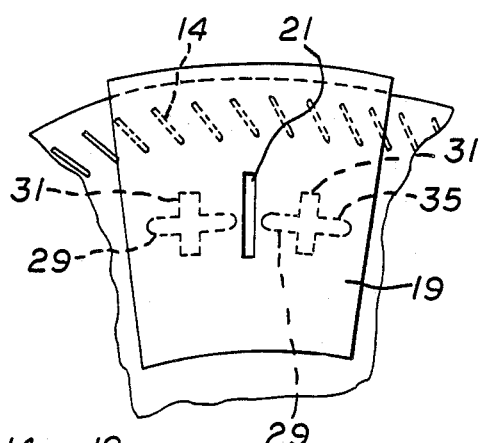
FIG. 2 is an enlarged view of portion A of FIG. 1.

As is shown in the drawings, which are provided for the purpose of illustration, the invention is embodied in an optical encoder apparatus for determining position of a moving member having a plurality of optical flags arranged sequentially thereon, placed between a source of illumination and a detector. Signal processing means are operative to discriminate first, second and third waveform portions of the signal generated by the detector. The first portion of the waveform has an amplitude less than a first threshold; the second portion has an amplitude greater than the first threshold and less than a second threshold, and the amplitude of the third portion is greater than the second threshold amplitude. The signal processing circuitry is responsive to this intermediate second threshold portion, to generate a count signal. The edge transitions of the optical flag are therefore blurred to avoid the necessity of a second detector for quadrature detection to achieve vibration insensitivity.

In accordance with the invention, there is therefore provided an optical encoder apparatus for determining position of a moving member, comprising a source of illumination; detector means for receiving the illumination and for producing an output signal indicating the quantity of illumination received; the moving member having a plurality of optical flags arranged sequentially on the moving member such that the flags are sequentially interposed in a light path between the source and the detector means, each of the flags being shaped so as to transmit or reflect the illumination to the detector means such that the waveform of the detector means output signal has a first amplitude portion less than a first threshold, a second amplitude portion greater than the first threshold and less than a second threshold, and a third amplitude portion greater than the second threshold; and signal processing means operative to sense the first, second, and third waveform amplitude portions and to generate a count signal responsive to sensing a sequence of the first and second, and third waveform portions.

As is shown in the drawings, the optical encoder apparatus of the invention essentially comprises a mechanical section and an electrical, signal processing section. The mechanical section includes an optical encoder member, which in the currently preferred mode comprises a disc 10, having plus sign shaped apertures arranged around the periphery of the disc, which is adapted to be journaled to a rotating shaft, or otherwise to a camming mechanism, so as to be able to provide a correlation with the rotational position of such a shaft or camming mechanism. The optical encoder itself may alternatively take different forms, such as a drum having optical flag apertures arranged in a regular sequence, or a continuous strip or tape. Optical encoding may also be achieved by reflective flags arranged on the encoder number. The optical encoder disc, in addition to the plus sign shaped flags 12, may also bear tachometer flags 14 or another type of encoder grating to provide information as to rotational velocity. The sequence of optical flags may be interrupted to provide a dead zone 16, corresponding to a portion of the cycle of rotation of the shaft or camming mechanism, which need not be counted, such as the portion of the machine or pump cycle during which there would be no flow.

Figure 3:
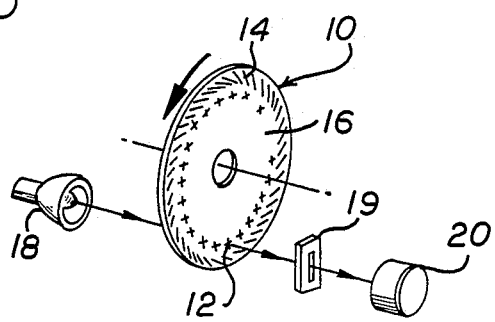
FIG. 3 is a perspective view of an optical encoded disc and photo-optic detector assembly.
Figure 4:
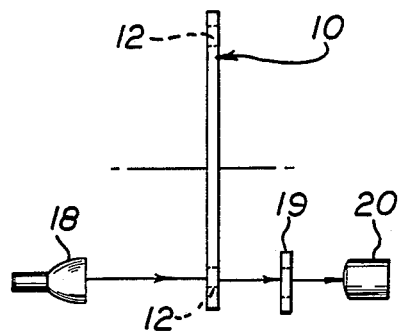
FIG. 4 is a side elevational view of the photo optic detector assembly of FIG. 3.

Referring to FIGS. 3 and 4, the optical encoder is positioned so as to rotate the optical flags between a light source 18, which preferably emits infrared light, which is transmitted through the optical flag apertures in the optical encoder disc through a slit 21 in an optical interruptor mask 19, which sharply delimits the portion of light transmitted, to the photodetector 20.

Figure 5:
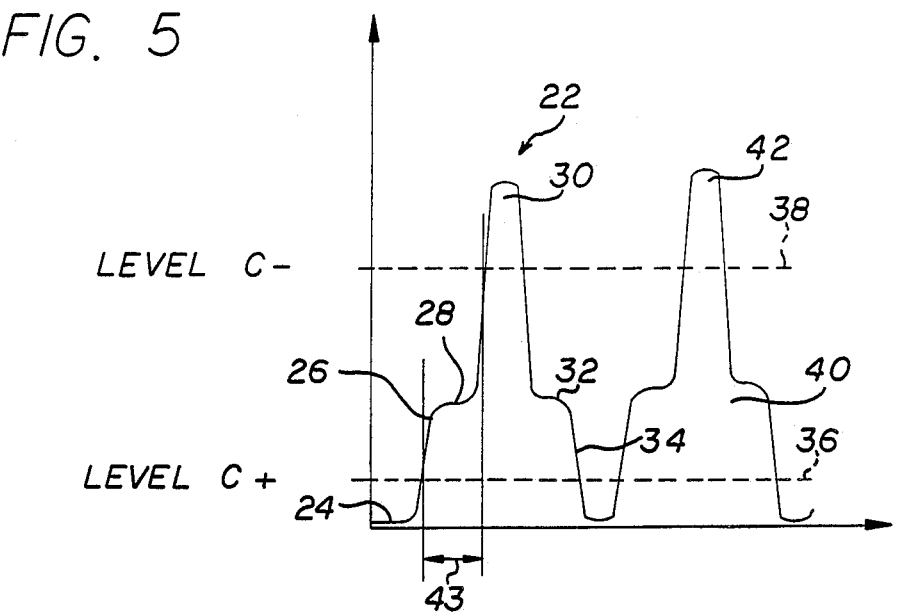
FIG. 5 is a diagram of the waveforms generated by the optical encoder detector.

As the optical encoder disc rotates, in a unidirectional rotation, the photodetector receives the infrared light transmitted through the optical flags and generates a signal having a waveform 22, as is illustrated in FIG. 5. Each wave preferably has a null amplitude level 24, a leading edge portion 26, and a leading intermediate portion 28, corresponding to detection of a leading arm portion 29 of the rectilinear crosslike aperture. A central amplitude spike portion 30, corresponds to the up-right central portion 31 of the plus sign shaped optical flag. As the optical flag continues to pas before the slit of the optical interrupter mask, the photodetector will generate a trailing intermediate portion 32 of the waveform, corresponding to the trailing arm 35 of the plus sign-shaped optical flag, and a trailing edge portion 34. In terms of detection of the signal levels of the waveform, the signal processing circuitry must be sufficient to detect when the signal level is below the first threshold level (C+) 36; above the first threshold level (C+) 36, and below a second threshold (C−) 38, corresponding to the leading and the trailing portions of the waveform; and must also be sufficient to detect a signal level above the second threshold level, corresponding to the peak which occurs as the center portion of the plus sign-shaped optical flag passes by the detector. The portion 40 of the C+ or first threshold level would normally be subject to detection of vibrational errors at the edge transitions of the optical flag, but the central portion 42 above the second threshold level C−, intermediate to the leading and trailing portions of the waveform, provides an additional latch which must be detected before the optical encoder system will generate a count signal.

Thus, the vibration tolerance of the optical encoder system depends upon the intersection of the leading edge of the waveform with the lower threshold, and the intersection of the leading edge of the central spike with the upper threshold. The vibration tolerance in the signal 43 roughly corresponds to the length of the leading arm portion of the optical flag. A similar effect can be obtained with a diamond shaped optical flag. A Z-shaped optical flag similarly has a central portion which would transmit a greater amount of illumination than either the leading or trailing ends of the optical flag, could also be used.

Figure 6:
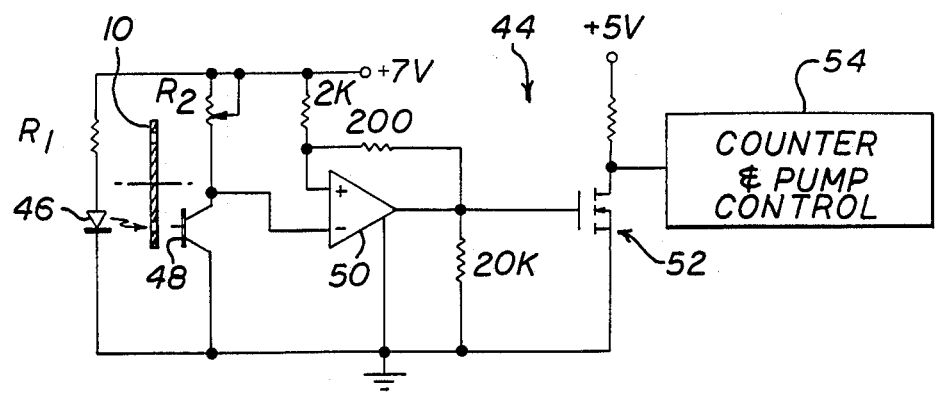
FIG. 6 is a schematic diagram of an exemplary form of electrical circuitry used for motion detection.

A simplified diagram of the electrical circuitry of the signal processing unit of the optical encoder apparatus is illustrated in FIG. 6. The signal processing circuitry 44 includes the infrared emitter 46 illuminating the optical flags of the encoder disc positioned between the emitter and a photodetector 48. The electrical circuitry also includes an analog to digital converter with a large hysteresis, commonly called a Schmitt trigger. The operational amplifier 50 is in this exemplary circuit of the open collector type, but other types of operational amplifiers may also be used, with corresponding adjustments in the resistors to obtain equivalent results. A level shifting output FET 52 provides an output count signal to a counter, and to the accompanying mechanical control or pump control circuitry 54.

It should be noted that the threshold level C+ is the illumination level below which electrical output "C" to the counter and control mechanisms will be in a high state. Light level C− is that level of amplitude in which the electrical output C will be driven low. Any illumination level between C+ and level C− will not change the electrical output, independent of whether the output is high or low. Thus, once a physical position of an optical flag is reached which results in a sufficiently low illumination to change the output to a high state, the physical position of the flag is required to change enough for the illumination level to rise to the C− level for the output to go low.

In view of the foregoing, it has been demonstrated that the optical encoder apparatus of the invention is advantageous in compensating for vibration which otherwise would normally induce transition edge errors in monitoring rotational phase position, economically and with reduced complexity, by avoiding the need for quadrature detection of vibration errors. It is also significant that the combination of the mechanical portion including the optical encoder disc, and the associated electronic circuitry, blurs edge transition errors, improving the reliability and usefulness of the optical encoder system, which is particularly suitable for monitoring flow rate in a medical infusion pump, in situations subject to vibrations.

Although specific embodiments of the invention have been described and illustrated, it is clear that the invention is susceptible to numerous modifications and adaptations within the ability of the those skilled in the art and without the exercise of the inventive faculty. Thus, it should be understood that various changes in form, detail and use of the present invention may be made without departing from the spirit and scope of this invention.

I claim:

1. An optical encoder apparatus for determining position of a moving member, comprising:

a source of illumination;

detector means for receiving said illumination and for producing an output signal indicating the quantity of illumination received;

said moving member having a plurality of optical flags arranged sequentially on said moving member such that said flags are sequentially interposed in a light path between said source and said detector means, said optical flags being spaced apart and separated by a null illumination portion of said moving member which is not operative to transmit or reflect said illumination to said detector, each of said flags being operative to transmit or reflect said illumination to said detector means, each of said optical flags having a principal illumination portion and first and second intermediate illumination portions on either side of said principal illumination portion such that the waveform of the detector means output signal has a normal sequence of a null amplitude portion corresponding to said null illumination portion less than a first threshold, a first intermediate amplitude portion corresponding to said first intermediate illumination portion greater than said first threshold and less than a second threshold, principal amplitude portion corresponding to said principal illumination portion greater than said second threshold, and a second intermediate amplitude portion corresponding to said second intermediate illumination portion greater than said first threshold and less than said second threshold; and signal processing means operative to sense said null, first intermediate, principal, and second intermediate waveform amplitude portions and to generate a count signal responsive only to sensing a sequence of said null, intermediate, and principal portions, and whereby said signal processing means is not subject to generating an erroneous count signal responsive to sensing of sequences of only two of said illumination portions due to directional changes of movement of said moving member.

2. The apparatus of claim 1, wherein said moving member comprises a rotating disc, and said optical encoder apparatus is operative to determine the rotational phase of the disc.

3. The apparatus of claim 1, wherein said output signal waveform has a null signal portion, a leading edge portion, a leading intermediate portion, a central portion, a trailing intermediate portion, and a trailing edge portion.

4. The apparatus of claim 1, wherein said flags have the shape of a rectilinear cross having an upright portion and a transverse portion.

5. The apparatus of claim 1, wherein said flags are Z-shaped.

6. The apparatus of claim 1, wherein said flags are diamond shaped.

7. The apparatus of claim 1, wherein said source of illumination is a means for emitting infrared radiation.

8. The apparatus of claim 7, wherein said detector means comprises a photodetector adapted to detect infrared radiation.

9. The apparatus of claim 8, wherein said detector means includes an optical interruptor mask positioned between said source of illumination and said photodetector.

* * * * *